US008615676B2

(12) United States Patent
Bender et al.

(10) Patent No.: US 8,615,676 B2
(45) Date of Patent: Dec. 24, 2013

(54) PROVIDING FIRST FIELD DATA CAPTURE IN A VIRTUAL INPUT/OUTPUT SERVER (VIOS) CLUSTER ENVIRONMENT WITH CLUSTER-AWARE VIOSES

(75) Inventors: Carl Duane Bender, Pflugerville, TX (US); Veena Ganti, Austin, TX (US); Maria deLourdes Garza, Austin, TX (US); Neal Richard Marion, Georgetown, TX (US); James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 13/071,425

(22) Filed: Mar. 24, 2011

(65) Prior Publication Data
US 2012/0246517 A1 Sep. 27, 2012

(51) Int. Cl.
*G06F 11/00* (2006.01)
(52) U.S. Cl.
USPC ........... 714/4.1; 714/4.11; 714/4.12; 714/4.2; 714/25; 714/48
(58) Field of Classification Search
USPC ........................ 714/4.1, 4.11, 4.12, 4.2, 25, 48
See application file for complete search history.

(56) References Cited

U.S. PATENT DOCUMENTS

| 7,007,200 | B2 | 2/2006 | Salem |
| 7,080,287 | B2 | 7/2006 | Salem |
| 7,392,421 | B1 | 6/2008 | Bloomstein |
| 7,457,722 | B1 | 11/2008 | Shain |
| 7,617,257 | B2 | 11/2009 | Sathyanarayan |
| 8,274,881 | B2 * | 9/2012 | Allen et al. ................... 370/216 |
| 2006/0123024 | A1 | 6/2006 | Sathyanarayan |
| 2008/0189468 | A1 | 8/2008 | Schmidt |
| 2009/0307377 | A1 * | 12/2009 | Anderson et al. ................. 710/3 |
| 2009/0307460 | A1 * | 12/2009 | Nevarez et al. ............... 711/203 |
| 2009/0313401 | A1 * | 12/2009 | Mani et al. ...................... 710/38 |
| 2010/0318838 | A1 * | 12/2010 | Katano et al. ..................... 714/4 |
| 2012/0066543 | A1 * | 3/2012 | Pafumi et al. ................ 714/4.11 |
| 2012/0150805 | A1 * | 6/2012 | Pafumi et al. ................ 707/640 |
| 2012/0151265 | A1 * | 6/2012 | Bender et al. ................... 714/37 |
| 2012/0159245 | A1 * | 6/2012 | Brownlow et al. ............. 714/23 |

* cited by examiner

*Primary Examiner* — Charles Ehne
(74) *Attorney, Agent, or Firm* — Yudell Isidore Ng Russell PLLC

(57) ABSTRACT

A first virtual I/O server (VIOS) provides a cluster aware (CA) operating system (OS) executing on a processor resource of the first VIOS to register the first VIOS within a VIOS cluster. The first VIOS comprises a first field/failure data capture (FFDC) module that executes within the first VIOS and performs the functions of: receiving from an event listener a signal indicating that an FFFDC event/condition has been detected by the first VIOS; and automatically transmitting FFDC data to the shared storage repository for storage of the FFDC data within the shared storage repository. The FFDC module further performs the functions of: transmitting to one or more second VIOSes within the VIOS cluster, one or more messages to inform the one or more second VIOSes of an occurrence of the FFDC event/condition that was detected by the first VIOS.

20 Claims, 9 Drawing Sheets

PROVIDING FIRST FIELD DATA CAPTURE IN A VIRTUAL INPUT/OUTPUT SERVER (VIOS) CLUSTER ENVIRONMENT WITH CLUSTER-AWARE VIOSES

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product that implements first field data capture in a VIOS cluster.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. Thus, different client logical partitions (LPARs) associated with different virtualized server systems may access the same storage access network (SAN) storage. However, the client LPARs on one server do not have any "knowledge" of whether the SAN disk that the client LPAR is trying to access is being used by some other client LPAR belonging to the same server or another server.

Thus, the increase in the utilization of virtualization technology also leads to an increase in the potential problems and issues involved with implementing new hardware/software stacks. Included in such problems are those conditions that can prevent system input/output (I/O) operations from progressing due to new bugs that exist or manifest themselves in either the new hardware/software stacks or in legacy hardware/software stacks (e.g., due to compatibility issues. When these error conditions (or incompatibility scenarios) arise, system administrators potentially can be required to manually capture information in order to provide sufficient first field data capture (FFDC) information to a companies support department. This manual capture of FFDC is a time consuming process and susceptible to user errors.

BRIEF SUMMARY

Disclosed are a method, a data processing system, and a computer program product which provide first failure/field data capture (FFDC) and centralized storage of FFDC data within a DPS configured with cluster aware Virtual Input/Output (I/O) Servers (VIOSes) within a VIOS cluster. In a first VIOS partition, the method provides: a cluster aware (CA) operating system (OS) executing on a processor resource within the first VIOS partition to register the first VIOS within a VIOS cluster and enable communication of the first VIOS with one or more second VIOSes within the VIOS cluster and to a shared VIOS database; and a first field/failure data capture (FFDC) module that executes within the first VIOS and which performs the functions of: receiving from an event listener an signal indicating that an FFFDC event/condition has been detected by the first VIOS; and automatically transmitting FFDC data to the shared storage repository for storage of the FFDC data within the shared storage repository.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
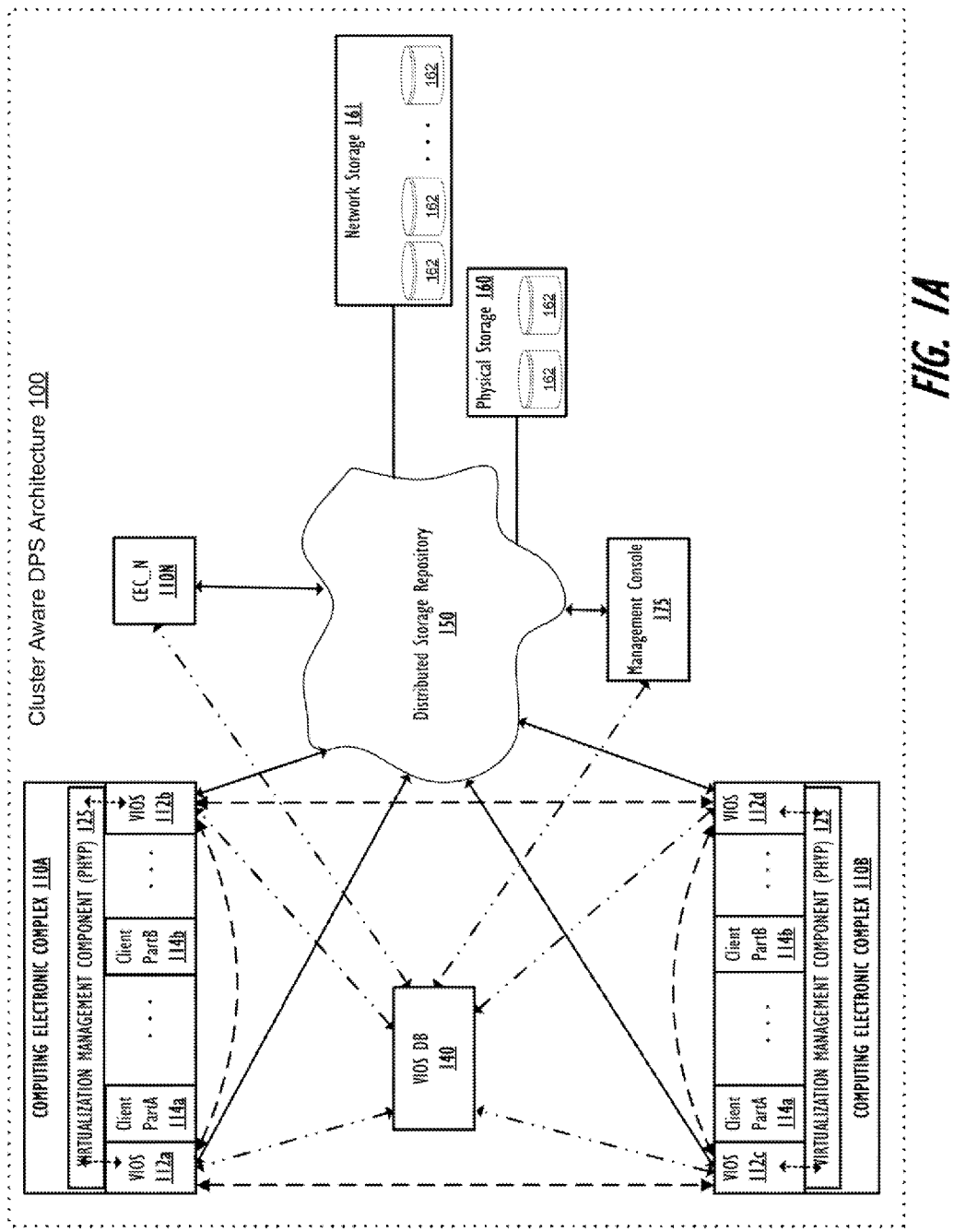
FIG. 1A illustrates a first view of a cluster (aware) data processing system within which various of the functional features of the described embodiments are implemented, according to one embodiment.

The illustrative embodiments provide a method, data processing system, and computer program product that enable first failure/field data capture (FFDC) and centralized storage of FFDC data within a DPS comprising a Virtual Input/Output (I/O) Server (VIOS) cluster in which the VIOSes are cluster aware. In a first virtual I/O server (VIOS) partition, the method provides: a cluster aware (CA) operating system (OS) executing on a processor resource within the first VIOS partition to register the first VIOS within a VIOS cluster and enable communication of the first VIOS with one or more second VIOSes within the VIOS cluster and to a shared VIOS database; and a first field/failure data capture (FFDC) module that executes within the first VIOS and which performs the functions of: receiving from an event listener an signal indicating that an FFDC event/condition has been detected by the first VIOS; and automatically transmitting FFDC data to the shared storage repository for storage of the FFDC data within the shared storage repository.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
    B. Cluster-Aware VIOS
    C. VIOS Shared DB for Cluster Management
    D. FFDC within a VIOS Cluster Environment
    D1. VIOS Fabric Loss and other FFDC Events
    D2. Detecting and Responding to FFDC events A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
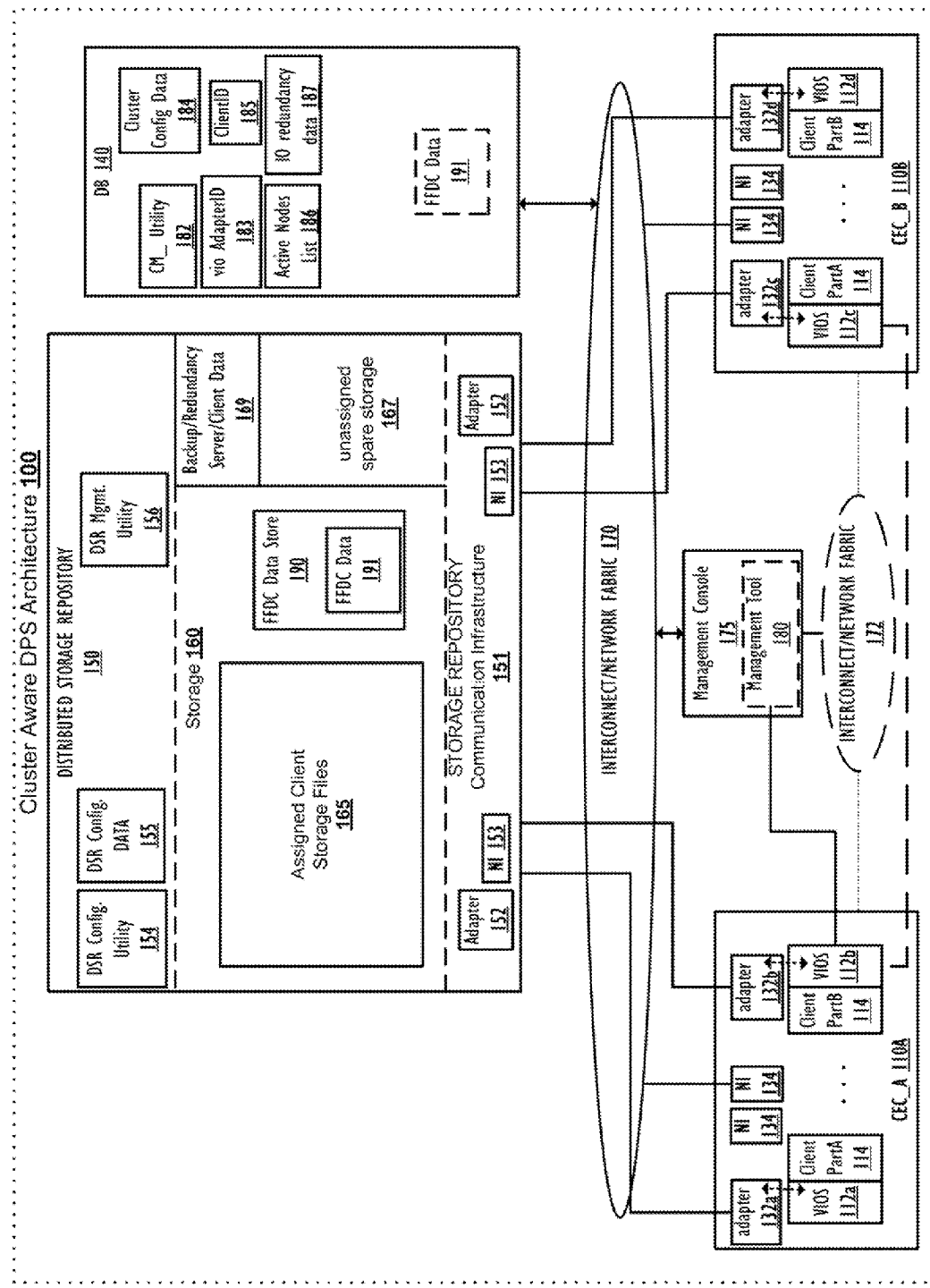
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (via emulation of physical I/O adapters 132) that are assigned to specific clients 114 of CECs 110.

Figure 4:
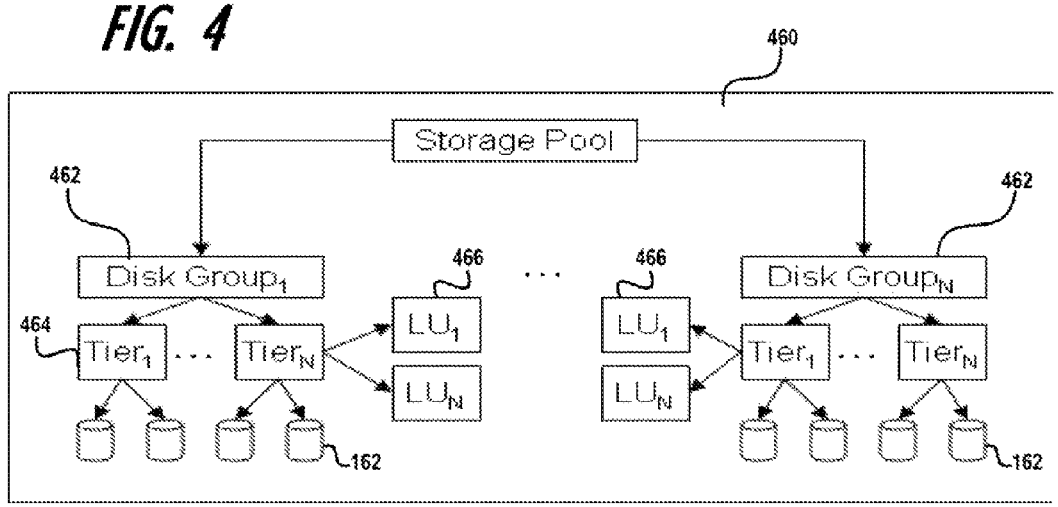
FIG. 4 illustrates an example shared storage pool utilized for storage I/O functions of the VIOSes, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CEC/VIOS/client configuration data storage 169. In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 4A illustrates an example configuration of a storage pool utilized within a cluster aware DPS 100. Specifically, FIG. 4A provides details on how these physical volumes are used within the storage pool. As shown, storage pool 460 within the cluster contains one or more Disk Groups 462. Disks Groups 462 provide administrators the ability to provide access policies to a given subset of physical volumes 162 within the storage pool 460. Once a disk group 462 has been defined, administrators can further categorize the subset into Storage Tiers 464 based on disk characteristics. Once a Disk Group 462 and Storage Tier 464 have been defined, administrators carve Logical Units (LU) 466 to be exported to client partitions (114).

With the capability of virtual pooling provided herein, an administrator allocates storage for a pool and deploys multiple VIOSes from that single storage pool. With this implementation, the SAN administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers.

Returning now to FIG. 1B, located within storage 160 of distributed storage repository (DSR) 150 is FFDC data store 190, within which FFDC Data 191 is stored. Specific functionality of FFDC data store 190 is provided (or described) in greater detail in Section D of the present disclosure. In an alternate embodiment, the FFDC Data 191 can be stored within VIOS DB 140. Regardless of the implementation, both storage locations (190 or 140) are accessible to management tool 180 and enable access by system administrative tools/personnel to the FFDC data 191.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a cluster aware operating system by management tool 180 and/or one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster. In one embodiment, management tool 180 registers with a single VIOS 112b and is thus able to retrieve/receive cluster-level data from VIOS, including FFDC data (191) of the entire cluster. In one implementation, the management tool 180 registers with a primary node of the cluster, as defined in greater details in Section D below.

Figure 2:
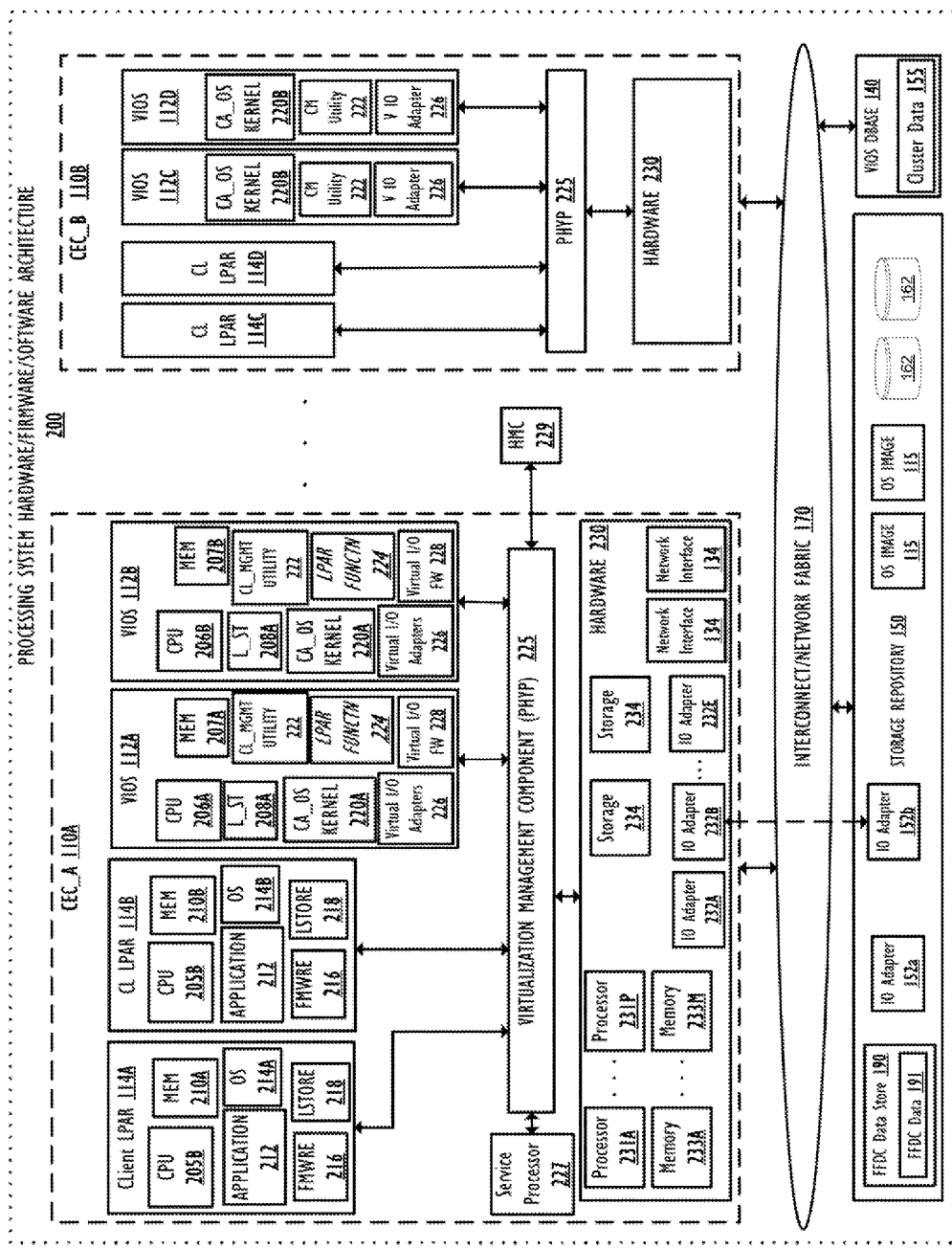
FIG. 2 illustrates an internal configuration of a computing electronic complex (CEC) within the cluster DPS having virtualized OS partitions, including virtual I/O server (VIOS) partitions with functional components that enable cluster awareness, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Figure 3:
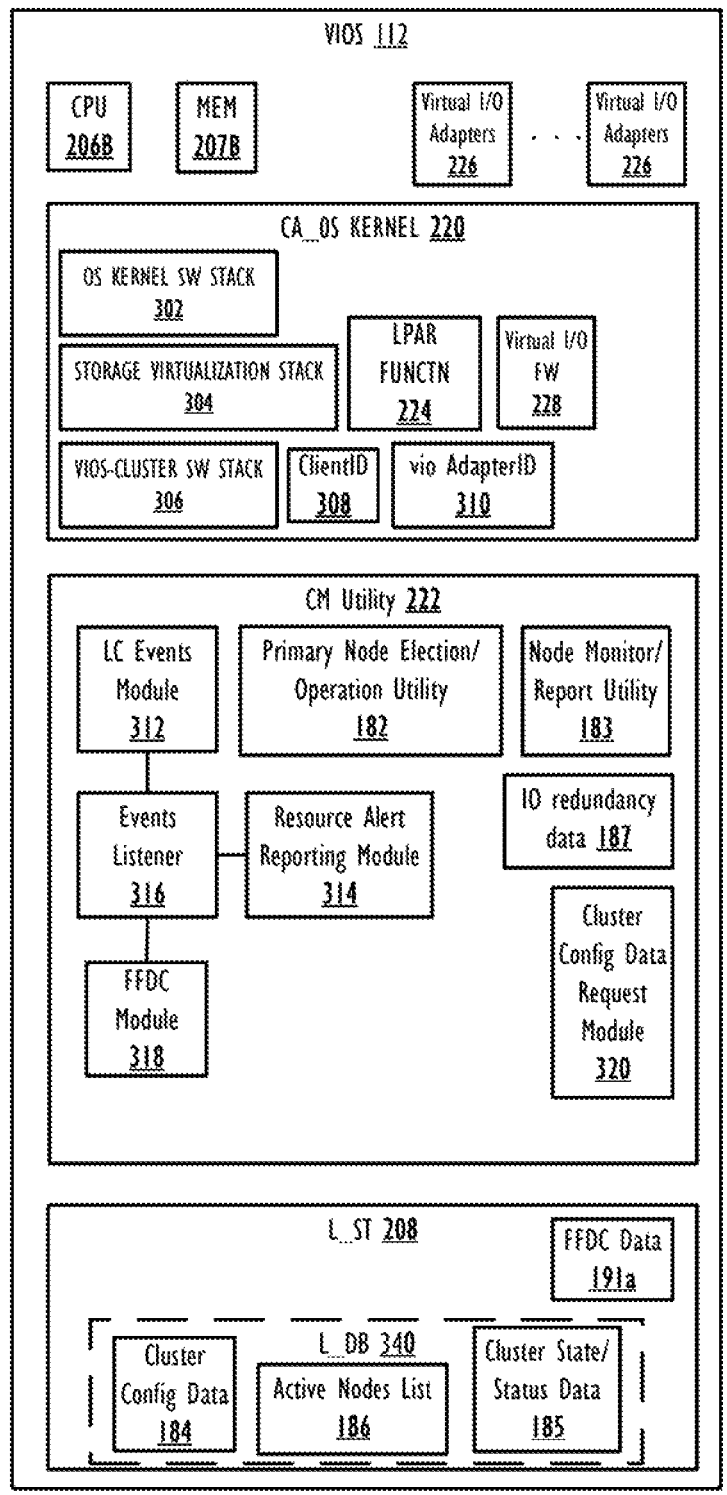
FIG. 3 is an expanded view of an example VIOS with internal software components/modules that enable the FFDC operations and other cluster-awareness functionality, according to one or more embodiments.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports virtual real memory and virtual shared storage functionality (with access to distributed storage repository 150) as well as clustering functionality. Relevant cluster level data is stored within local storage 208 of each VIOS 112. For example, as illustrated within FIG. 3, local storage (LS) 208 comprises cluster configuration data 184, cluster state data 185, active nodes list 186, and in one embodiment FFDC data 191$a$, where the "a" is provided to distinguish that FFDC data of VIOS (112$a$) from other FFDC data (191$b$ ... $n$) that would be stored locally to other VIOSes (112$b$ ... $n$) with in the cluster. Other features and/or functionality of FIG. 3 are described below.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system (s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. With reference now to both FIG. 2 and FIG. 3, which provides an expanded view of functional components/modules within example VIOS 112. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In one or more embodiments, CA_OS 220 can comprise cluster management (CM) utility 222, which supports the configuration of the VIOS to enable cluster-awareness and cluster-level functionality, such as redundant virtual I/O. Each of the additional software components/modules of CA_OS 220 may be presented as a functional module within CM utility, in one embodiment, and each module may thus be described as being associated with or a component within CM utility 222 throughout the remainder of this specification. In one embodiment, CM utility 222 may be a separate utility that is locally installed or downloaded (from DB 140, for example) as an enhancement to an existing OS within a CEC 110 or VIOS 112, when the VIOS 112 is initially being configured for operation within a VIOS cluster. CM utility 222 is then executed when configuring the individual VIOS to create or join a cluster and/or become a cluster-aware node within the VIOS cluster. With this implementation methodology, CM utility 222 executes within VIOS 112 and enables the OS to support the various cluster-awareness and other cluster-level features and functionality. In an alternate embodiment, CA_OS 220 includes all the clustering features and functionality and establishes the various clustering functions/features when the VIOS 112 joins the cluster and/or during configuration of VIOS 112 to become cluster-aware.

In one implementation, functional components of CM utility 222 are encoded on local device storage (L_Store 208) of a corresponding VIOS 112, and these components are automatically executed on VIOS start up or initiation such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS 112 executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

Returning now to the figures as further presented by the illustrative embodiments (i.e., FIGS. 2 and 3, with emphasis on FIG. 3), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein. CA_OS kernel 220 comprises three layers of software stack, OS kernel software stack 302, storage virtualization software stack 304, VIOS clustering software stack 306.

The illustrative embodiment of FIG. 3 also presents several of the components/modules of CM utility 222. Included among this non-exclusive list of components/modules are: primary node election utility 182, utilized during a primary node election process to allow VIOS 112 to register as a primary node of the VIOS cluster; node monitoring and reporting utility 183 utilized to enable registration by a management tool (e.g., management tool 180); I/O redundancy data 187, which specifies neighboring VIOSes to hand off I/O operations to when a condition at the VIOS or on the connection fabric prevents the VIOS from performing I/O operations for one or more of the registered clients; and cluster registration (or configuration data request) module 320, which initiates and controls the registration of the VIOS with the VIOS cluster during initialization of the VIOS within the DPS 100 (FIGS. 1-2). In addition to these components, CM Utility 222 also comprises components specific to event monitoring and FFDC operations. Included among these components are the following non-exclusive list of components: lifecycle (LC) events module 312, which tracks events or conditions at the VIOS that are considered (or pre-defined to be) life cycle events; resource alert reporting module 314, which detects when an allocated, shared resource (e.g., an amount of storage within a storage pool assigned to one or more clients serviced by the VIOS) reaches some pre-established threshold condition (e.g., a percentage usage of the storage pool); events listener 316, which monitors for the occurrence of one or more events detected by the LC events module 312 and/or the Resource module 314 and/or any other module that may report events of interest to the VIOS, to the cluster, or to system administrators; and FFDC module 318, which responds to a triggered from events listener 316 by forwarding associated FFDC data (191) to an appropriate data store within a shared storage that is accessible to all VIOSes/nodes within the cluster. According to one or more embodiments, FFDC module 318 also generates and transmits, in response to certain events, one or more alerts to other nodes within the cluster to inform the other nodes of the occurrence of the specific event.

Returning to the illustrative embodiment of FIG. 2, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B, FIG. 2 and FIG. 3 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms can be utilized interchangeably throughout the specification.

With the above introduced system configuration of FIGS. 1A, 1B, 2 and 3, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as, but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

In one embodiment, DB 140 receives VIOS generated data from each VIOS across the cluster and DB 140 populates its various data structures with the received data. According to one embodiment, VIOS 112 creates a unique identifier (ID) (i.e., a ClientID) for each client that is mapped to the VIOS for I/O processing. The VIOS 112 then stores the unique ClientID in ClientID data structure 159 (FIGS. 1B and 5) within DB 140. The DB 140 and by extension the ClientID data structure 159 are accessible to each VIOS partition in the cooperating cluster (DPS 100). The VIOS 112 also generates an identifier for each virtual IT nexus (virtual I/O AdapterID) that is utilized for each virtual adapter assigned to the client LPAR 114. These vio AdaptedIDs are stored in the AdapterID data structure 158 and are associated with their corresponding clientIDs (block 312). With this use of DB 140 to maintain clientID-to-VIO Adapter mappings, each clientID can be associated with a corresponding one or more vio AdapterIDs, and every VIOS within the cluster is aware of the I/O adapter mappings across the entire cluster.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

Figure 5:
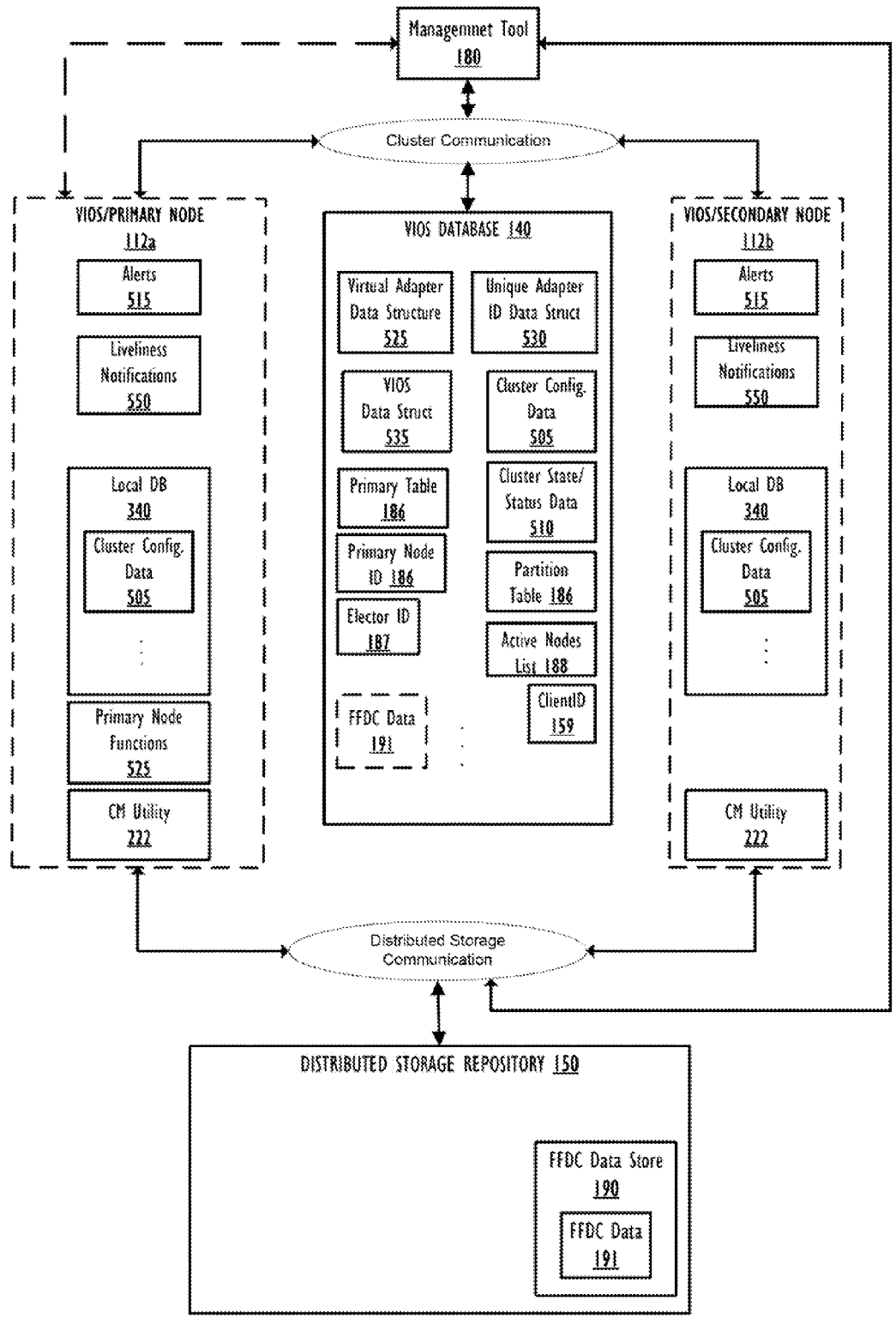
FIG. 5 is a block diagram representation of stored data structures and other functional components, which enables cluster level information/data management and exchange between a management tool, a primary node, secondary node and the shared database and storage repository, according to one embodiment.

FIG. 5 is a block diagram representation of functional components of a primary node, a secondary node and shared storage (DB 140) to enable cluster level information/data storage, management and exchange between the nodes and VIOS shared storage (DB 140). In one embodiment, a local copy of (relevant data of) DB 140 is shared by each VIOS within the cluster and stored in respective local DB 340. Each VIOS is then responsible for storing, maintaining and updating the data structures at DB 140 in one embodiment. As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.) According to the figure, DB 140 includes a virtual adapter data structure 525, which maintains a listing of and configuration information about the virtual adapters. DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535. In one or more embodiments, each of the described data structures 525-535 can be or can include a table within DB 140. When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. When a VIOS 112 is first configured, the VIOS downloads from DB 140 a copy of cluster configuration data 505 and cluster state/status data 510 from VIOS DB 140. Additional data that can be retrieved from DB 140 are partition data 186, active nodes list 188, and client ID data structure 159. In one embodiment, VIOS DB 140 can comprise a copy of FFDC data 191. VIOS DB 140 may comprise a plurality of additional data structures and/or components, some of which are illustrated within VIOS DB 140, but are not germane to the description of the embodiments presented herein.

In one embodiment, data stored within VIOS DB 140 is accessible to management tool 180 via a cluster communication infrastructure. When FFDC data 191 is stored at VIOS DB 140, this direct connection of management tool 180 enables management tool 180 to efficiently access all FFDC data 191 across the entire VIOS cluster from DB 140. In an alternate embodiment, management tool 180 is provided access to FFDC data 191 from any one or VIOSes 112 within DPS 100. In the illustrative embodiment, management tool 180 has a communication link 550 with VIOS 112a, which servers as a primary node for the cluster. In one example scenario, different clients LPARs associated with different VIOS access different storage devices and do not have visibility to the storage accessed by other client LPARS and/or to the data stored or accessed by those other client LPARS. Without implementation of the functionality of the described embodiments herein, this scenario can lead to duplication of data on different client LPARs and result in a waste of storage space. Additionally, if there is a need to update the data with the system, then the update function will have to be synced up on all the storage devices having the same data.

According to one embodiment, the VIOSes that are part of the cluster can query each other to get information regarding the storage and data seen by the other VIOS. This VIOS level query leads to efficient data discovery and substantially reduces (or eliminates) duplication of data. In one implementation, the events and alerts infrastructure enables a node (VIOS) to know which other node could potentially have access to the storage that has the required data, in the event that a node goes down. Further, the queries can be executed on any node in the cluster and still dynamically retrieve real time data. Thus, any one of the VIOSes can be queried by the management tool 180 to provide all the information for some other VIOS or for all the nodes within the cluster. The flexibility provided to the management tool further enhances the management tool's performance, as the management tool 180 can obtain all the data by querying just a single node, instead of having to query each node in the cluster, in sequence. As further illustrated by FIG. 5, management tool 180 may also retrieve or access FFDC data 191 from FFDC data store 190 within distributed storage repository 150.

D. First Failure/Field Data Capture in VIOS Cluster Environment

According to one embodiment, when a virtual client (client LPAR 114) experiences error conditions (e.g., problems due to a VIOS the client LPAR 114 is logically connected to or to side affects from issues affecting other nodes within the cluster), system administrators no longer have to manually capture information from each node within the cluster in order to provide sufficient first field data capture (FFDC) information to a support department. The clustered VIOS topology and other functionality associated therewith reduce the time consumption and the susceptibility of the manual process to user errors. Functional aspects of cluster-aware VIOS provide a mechanism that can simultaneously initiate and capture cluster wide FFDC information and store it within a single repository.

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository (storage repository) 150. The various presented embodiments further provide application of management tool (180) functionality and descriptions of the messaging and communication protocols (of the clustered VIOSes 112) that collectively enable cluster-awareness and efficient I/O and storage virtualization and I/O and storage management within the DPS. These embodiments are supported/provided by additional functionalities of (i.e., encoded within) the CA_OS 220 and/or specifically CM utility 222.

According to one embodiment, CM utility 222 comprises functional modules that execute on the respective VIOS processor to enable efficient completion of FFDC functions within the DPS 100. The described embodiments enable system administrators to configure clustered environments FFDC techniques based on specific cluster entity life cycle events and alerts. This methods decreases the amount of manual FFDC capturing required by legacy software stacks which in turn reduces the amount of time, money, and resources required to capture such information within a clustered environment. As presented herein, one described embodiment provides Virtual-Cluster software stack 306 with FFDC data collecting and reporting functions that are added to further enhance the Storage Virtualization Stack 304 (FIG. 3).

D.1 VIOS Fabric Loss and Other FFDC Events

Figure 6:
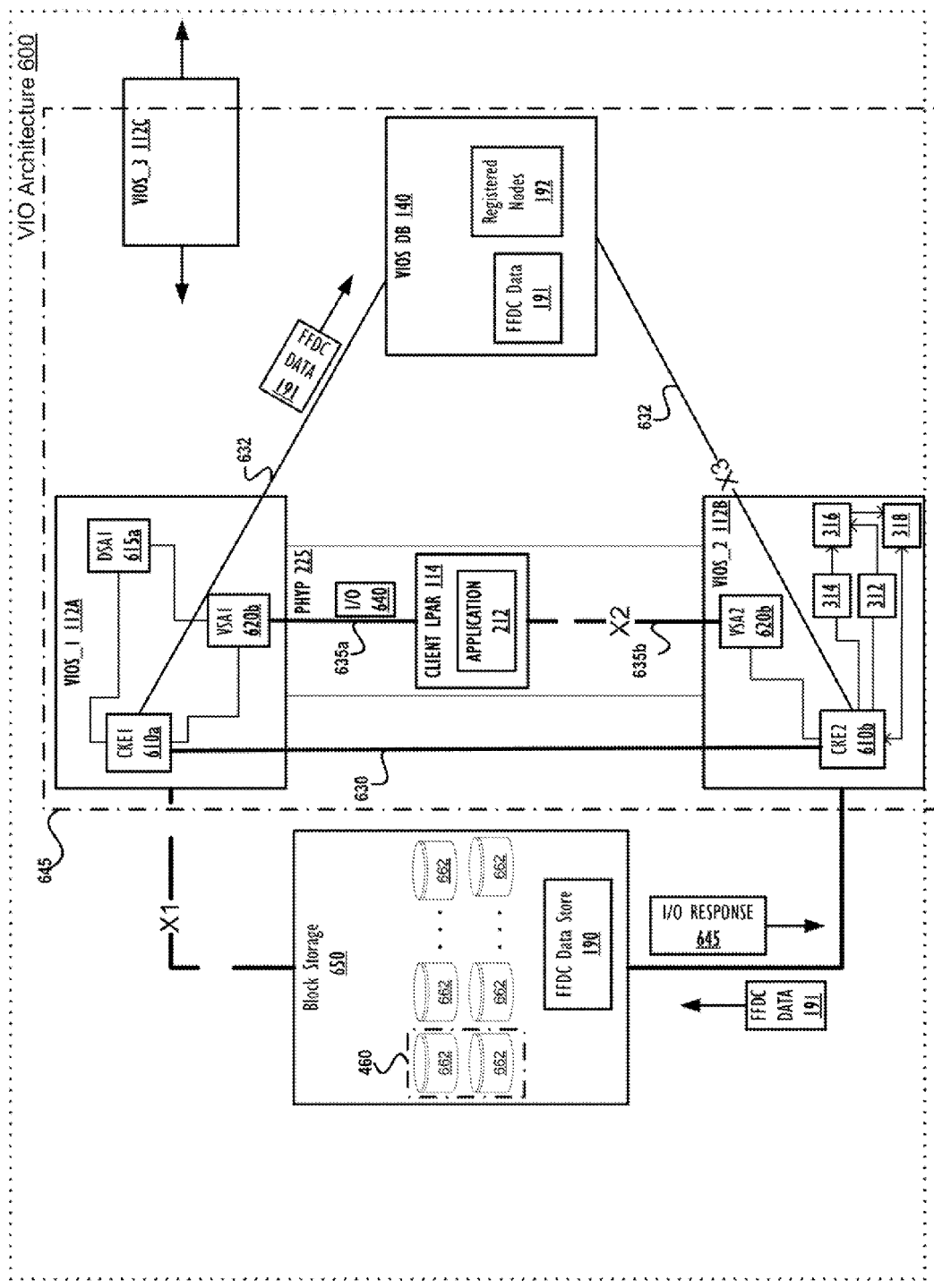
FIG. 6 is a block diagram representation of a cluster aware VIOS architecture in which one or more resource events and/or life cycle events are illustrated, according to various embodiments.

Specific examples of FFDC events or conditions for which FFDC data is generated and alerts and or notifications issued to nodes within the cluster are presented with reference to FIG. 6. Turning now to FIG. 6, there is illustrated a block diagram representation of the DPS 100 comprising a VIOS cluster having two or more VIOSes, namely VIOS1 112A and VIOS2 112B. The figure specifically provides an illustration of the interconnectivity between VIOSes and between each VIOS and shared block storage 650 and VIOS DB 140. Specifically, FIG. 6 provides a graphical representation of different types of connectivity losses that may occur within a cluster system and that can generate corresponding FFDC data, according to various embodiments.

As illustrated by FIG. 6, virtual I/O (VIO) architecture 600 comprises two interconnected VIOSes, VIOS1 112A and VIOS2 112B. Each VIOS 112 connects to block storage 650 via respective system-level storage interconnect fabric 625a and 625b. While illustrated as a single interconnect, the connection between the VIOSes and block storage 650 is generally referred to herein as a storage interconnect fabric 625 since the actual connection may be a complex switch or network of wires. It is further appreciated that one or more communication hops within storage interconnect fabric 625 can be a wireless connection. The term fabric loss thus refers to any type of degradation or stoppage in the ability of a VIOS 112 to transmit (or receive) data over any portion of storage interconnect fabric 625 to/from block storage 650.

As utilized herein, block storage 650 (or block storage facility) represents any type of storage that is generally accessible from any one of multiple VIOSes within a VIOS cluster. This, block storage 650 may be the distributed storage repository 150, other network accessible storage, or local storage (e.g., storage 234 of FIG. 2). When block storage 450 is distributed storage repository 150, block storage may be a SAN or NAS, in one embodiment. Block storage 650 includes shared storage pool 460 that is accessible by one or more VIOSes within the VIOS cluster 645. Conditions occurring within storage pool 460 can be reported back to each VIOS (112B) in response to receipt from that VIOS of an I/O operation. The information related to the conditions are embedded within the I/O response packet 642 in one embodiment.

Each of VIOS1 112A (first VIOS) and VIOS2 112B is interconnected via intra-cluster interconnect fabric 630, which connects each VIOS (e.g, VIOS_A 112A) with one or more other VIOSes (e.g., VIOS 112B) to create the VIOS cluster 645. VIOS Cluster 645 also comprises VIOS DB 140 to which each VIOS 112 within the cluster is connected via respective cluster-level interconnect fabric 632. Notably, within the described embodiments, the first and second VIOSes (112A/112B) can exist on the same CEC or on different CECs within the cluster.

Each VIOS 112A, 112B includes internal software structures within respective software stacks by which the VIOSes 112A, 112B are able to communicate with each other as well as with VIOS DB 140 and distributed storage repository 150. For example, illustrated within first VIOS 112A are the following software structures, without limitation: (1) cluster kernel extension (CKE) 610a, which is a kernel extension that allows the each VIOS (e.g., first VIOS 112A) to communicate with other VIOS nodes (e.g., second VIOS 112B) within the VIOS cluster 645; (2) distributed storage access (DSA) 615a, which is also a virtual interface that monitors the connectivity of a storage fabric from the VIOS; and (3) virtual server adapter (VSA) 620a, which is the virtualized I/O adapter that the VIOS assigns to a specific client to communicate I/O requests between the client LPAR 114 and the assigned VIOS (es). During I/O operation, VSA 620 handles the communication of the I/O request from the client and the communication of I/O response to the client. DSA 615 checks the connection status of the storage interconnect 625 of the VIOS and signals CKE when a fabric loss condition is detected on the interconnect 625. CKE 610 handles the propagation of the I/O request to another VIOS when a fabric loss condition is detected by DSA 615 and is communicated by DSA 615 to CKE 610. According to one or more embodiments, CKE 610 also handles the transmittal of FFDC data 191*a* from first VIOS 112A to other VIOSes within VIOS cluster 645, e.g., second VIOS 112B. Also, when a fabric loss condition occurs with first VIOS 112A that prevents access by first VIOS 112A to block storage 650, CKE of first VIOS transmits the handling of the reporting function of the associated FFDC data generated by the fabric loss condition to the FFDC module 314 of the second VIOS 112B. FFDC module 314 of second VIOS 112B then handles transmission of the FFDC data 191*a* to the block storage 650. Thus, illustrated within second VIOS 112B are numbered blocks 312, 314, 316, and 318 respectively representing lifecycle events module, resource alert module, events listener, and FFDC module or FIG. 3. The additional functionality associated with and/or manner of usage of the above set of software structures are presented in detail below.

Three different types of fabric losses, which can trigger the FFDC response mechanisms and generate FFDC data are illustrated by FIG. 6. For illustrative purposes, a loss of VIOS connectivity (or access) to the block storage 650 (which in one embodiment is synonymous with distributed storage repository 150) is described as loss of physical connection (or connectivity) to the block storage 650, and is illustrated with an "X1" marking a premature termination of the specific interconnect (625*a*). This fabric loss of connectivity is further illustrated and indicated by the presence of dashed lines. In a second scenario, the first VIOS 112A itself fails or has an internal error condition that prevents the first VIOS 112A from being able to provide/fulfill the I/O operations to/of the client LPAR 114. In this scenario, the loss may be software related, and one such loss is illustrated within FIG. 6 with a "X2" representing an inability of the VIOS to communicate I/O operations from/to the client LPAR 114. In another scenario, a third type of fabric loss involves a loss of VIOS fabric connection (632) to/with VIOS DB 140 and is indicated by "X3". Notably, when any one of these condition occurs, VIOS redundancy functionality of the CM utility 222 enables the I/O operations to be transferred to different VIOSes within the VIOS cluster for handling.

FIG. 6 also illustrates a specific example of the fabric losses affecting the I/O operations of a client LPAR 114 on which an application 212 executes to generate example I/O operations for completion within the distributed storage repository 150. Shown beneath client LPAR 114 is virtualization management component (represented as PHYP 225). As described above, communication between client LPAR 114 and VIOS 112*a* occurs via PHYP 225 operating as the emulation layer facilitation exchange between the two virtual partitions. Client LPAR 114 is illustrated with connectivity 635 (enabled via software) to first VIOS 112A and third VIOS 112C. In this context, first VIOS 112A is the primary VIOS assigned to client LPAR 114 and first VIOS 112A normally handles most I/O operations originating from or directed towards client LPAR 114. Thus, while first VIOS 112A is functional and communicatively connected to distributed storage repository 150, client LPAR 114 (operating as the initiator of an I/O operation) communicates desired I/O operations 640 to/through first VIOS 112A via virtualization management component (presented as PHYP 225, in the illustrative embodiments). First VIOS 112A then completes the I/O operations on behalf of client LPAR 114 by forwarding the I/O request to block storage 150 (the target of the I/O operation) if there is no storage fabric loss condition detected on storage interconnect fabric 625*a*. In this scenario, the I/O requests are forwarded over storage interconnect fabric 625*a*. Likewise, I/O response (data or instructions, etc.) returned from distributed storage repository 150 are routed via storage interconnect fabric 625*a* from block storage 650 to first VIOS 112A, and first VIOS 112A then routes the I/O information received to client LPAR 114 via pHYP 225.

As shown by FIG. 6, the communication path 635*b* between client LPAR 114 and second VIOS 112A has been degraded (perhaps due to internal software/hardware issues) and is currently unusable for the client's storage software stack. The path 635*a* through PHYP 225 between client LPAR 114 and VSAT 620*a* (of VIOS1 112A) is available. However the physical connection (via storage interconnect 625*a*) to the block storage 650 has been degraded as VIOS1 112*a* is no longer connected to the block storage 650. Any one of the above fabric loss conditions can trigger an FFDC response. Additionally, failure of an I/O due to reasons other than a fabric loss can also trigger one or more FFDC data events.

In addition to the three fabric loss conditions, additional events/conditions that would trigger one or more FFDC responses include events/conditions that can be considered as life cycle events. Among these life cycle events are: (a) a complete failure of a VIOS (e.g., VIOS 112A becomes non-functional); (a) an addition of a third VIOS (e.g., VIOS 112C) to the cluster; and (3) a removal of a third VIOS (VIOS 112C) from the VIOS cluster. These life cycle events generate FFDC data 191 that is shared with other VIOSes within the cluster, in one or more embodiments. The FFDC data 191 can be stored within VIOS DB 140 and then relevant portions of that data are retrieved by one or more other VIOSes within the VIUOS cluster 645. In one or more embodiments, the other VIOSes are registered Nodes 192 that have registered within VIOS DB 140 for receipt of notification of the specific occurrence of the condition/event that causes generation of the FFDC data 191.

D2. Detecting and Responding to FFDC events

Figure 7A:
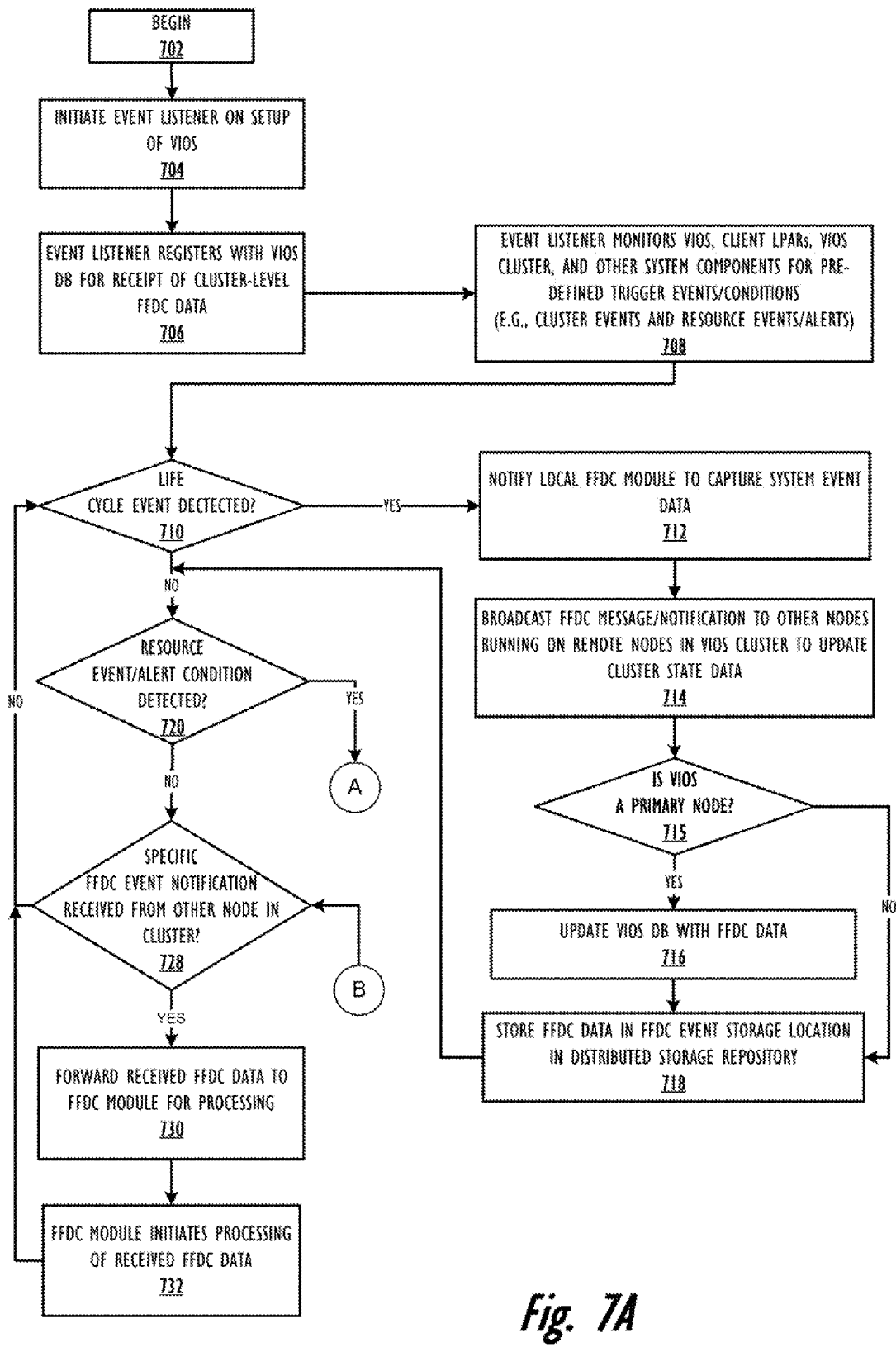
FIG. 7 is an example high-level logical flowchart illustrating the method by which a VIOS detects and responds to the occurrence of FFDC events within a clustered environment, according to one or more embodiments.
Figure 7B:
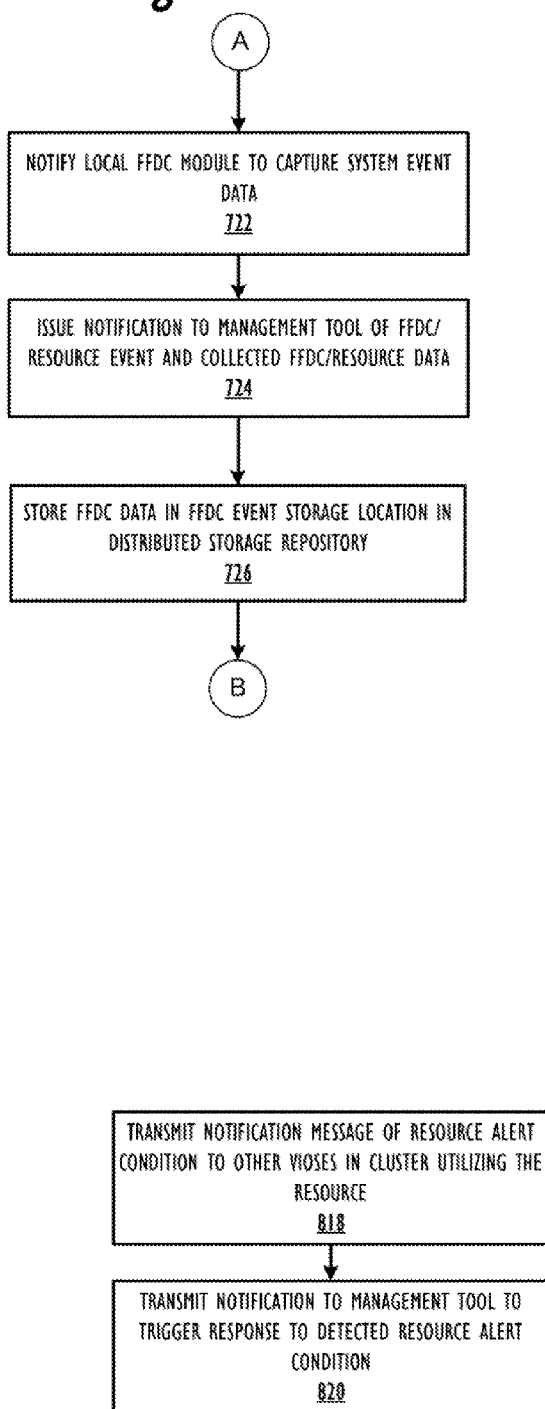
Figure 8:
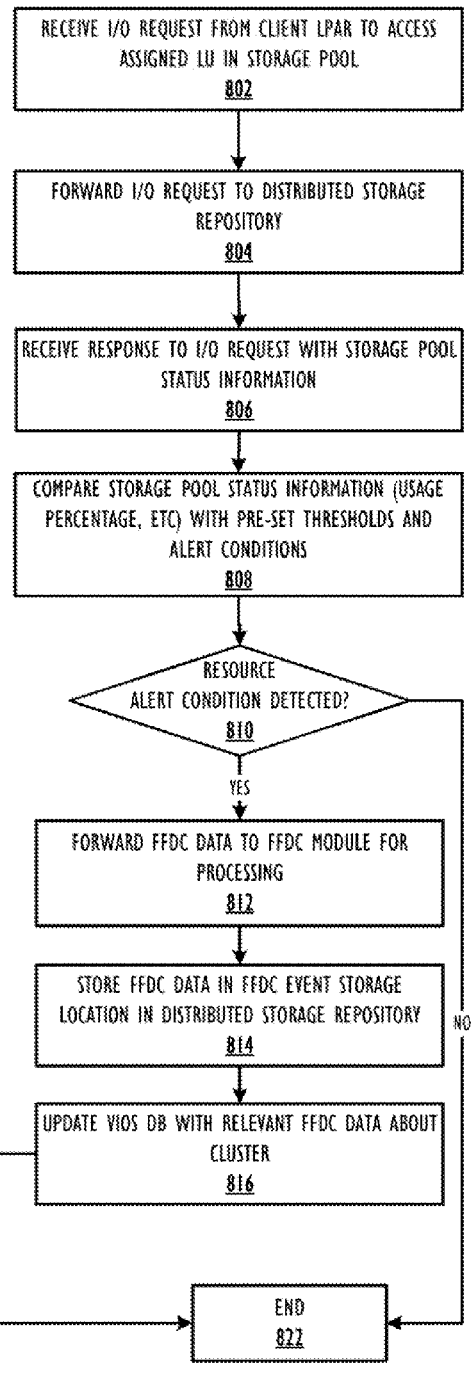
FIG. 8 is a high-level logical flowchart of an exemplary method of a VIOS detection and response to a resource event/condition, according to one or more embodiments.

FIGS. 7 and 8 are flow charts illustrating embodiments of various methods by which the above introduced processes of the illustrative embodiments are completed. Although the methods illustrated by FIGS. 7 and 8 may be described with reference to components and functionality illustrated by and described in reference to FIGS. 1-6, it should be understood that this is merely for convenience and alternative components and/or configurations thereof can be employed when implementing the various methods. Certain portions of the methods may be completed by components/modules of CA_OS 220 and/or CM utility 222 executing on one or more (virtual) processors (CPU 206A) within VIOS 112 (FIG. 1 or 2). The executed processes then control specific operations of or on CECs 110, VIOSes 112, and DB 140 (and distributed storage repository 150, in some embodiments). For simplicity in describing the methods, all method processes are described from the perspective of CM utility 222 and/or components/modules within CM utility 222 operating within a CA_VIOS 112 of a VIOS cluster.

Referring now to FIG. 7, there is illustrated a high level logical flowchart of an example method that performs of functions of initiating and capturing simultaneous multi-node cluster OS first field/failure data within a virtual clustered environment, according to one embodiment. Within the clustered VIOS environment, VIOS partitions and Client partitions may experience system errors due to new software stacks introduced into the data center. From the VIOS perspective, a VIOS may encounter errors that prevent the processing of I/O requests to virtual clients due to issues within new/legacy software stacks. From the client perspective, the client LPAR 114 may experience errors due to errors encountered by the VIOS which prevented I/O requests from being processed successfully.

According to one or more embodiments, execution of functional modules within the CA_OS 220 or CM utility 222, in addition to direct programming of a system administrator, can configure FFDC data collection of each VIOS and/or within the cluster as a whole. This FFDC data collection operation can be based on (a) node lifecycle events, (b) resource alerts, or (c) periodic system data collection. Examples of the node lifecycle events can include adding or removing a node to/from the cluster. Both of these two operations are considered life cycle events within the cluster, according to the illustrative embodiment. In one implementation, resource alerts represent alerts that are autonomously reported back to a management tool when a resource threshold has been breached. As an example, a storage pool within the distributed storage repository 150 can be configured to notify subscribers when the pools capacity exceeds 70% of used blocks. System administrator may also configure one or more VIOSes to perform periodic collection and dumps of other types of FFDC data.

When such events/conditions are encountered or detected within the cluster, one or more embodiments enables the node of the cluster that detects the occurrence of the event/condition to autonomously react and initiate a cluster-wide operation in response to the detection of the event/condition. The cluster-wide operation comprises capturing all relevant system information from each node within the cluster as needed and storing that information within a single pre-assigned storage location. According to the illustrative embodiments and with reference to FIG. 3, CA_OS generates an event listener 316 within each VIOS. As illustrated, the event listener 316 can be a functional module within CM utility 222, and event listener 316 interacts with other functional modules of CM utility 222 to provide the method illustrated by FIG. 7.

The method of FIG. 7 begins at initiation block 702 and proceeds to block 704, which illustrates the CM utility 222 initiating event listener (316, FIG. 3) during initialization/set up/boot up of VIOS 112. During or following the initiating of event listener 316 at the VIOS, the event listener 316 registers with the VIOS DB 140 for receipt of notification of cluster level FFDC data, such as lifecycle (block 706). The event listener 316 actively monitors the node operations, client LPAR operations and/or cluster management operations (e.g., when the node is a primary node) and/or local system conditions, and the event listener 316 listens for one or more pre-defined life cycle events as well as resource alerts (e.g., within the distributed storage repository 150) (block 708). When a life cycle event is encountered, as determined at block 710, the event listener 316 automatically notifies the FFDC module 318 within the VIOS to capture system event data (block 712). The FFDC module 318 generates and broadcasts a notification message to inform other FFDC modules running on remote nodes to initiate an FFDC data capture operation (block 714). If, as determined at decision block 715, the FFDC module 318 operates within a primary notification node, the FFDC module 318 updates the VIOS DB 140 with the FFDC data (block 716) before messaging the other nodes of the cluster to retrieve copies of or information about the stored FFDC data 191. According to one embodiment, in order to inform other nodes to perform the FFDC data capture operations, the FFDC module 318 broadcasts FFDC messages to the appropriate nodes that are registered with the VIOS DB 140 to receive notification of the specific type of event/condition. Once the message is broadcasted, and received by the kernel extensions of the other "remote" VIOSes, the received message request can be propagated up to the FFDC module of the respective remote nodes for processing.

Following the check for detection of life cycle events, event listener 316 determines at block 720 whether a resource event or alert condition is detected. FIG. 8, describe hereafter, provides a more detailed method of one embodiment by which an I/O resource event is detected. Within the present method, when the event listener 316 detects a resource event/condition (e.g., received from resource alert reporting module 314), the event listener 316 again forwards the information to the FFDC module 318, which captures the event data (block 722). The FFDC module 318 then issues a notification to management tool 180 with information about the resource event/condition and the collected FFDC/resource data (block 724). At block 726, the FFDC Module 318 also forwards the captured FFDC data to the FFDC data store 190 within the distributed storage repository 150 (and/or to VIOS DB 140, in some embodiments). When other types of pre-identified FFDC events are encountered or detected within the node or CEC, those other types of FFDC events are treated similarly to the life cycle events and/or the resource events/condition. Additionally, when FFDC event notifications are received at the local node from other nodes within the cluster, as determined at block 728, the kernel extension receiving the notification forwards the received FFDC data to the FFDC module 318 for processing (block 730). The FFDC module 318 initiates processing of the received FFDC data (block 732), but the FFDC module 318 does not perform any notification as the FFDC data was received from another node. In one alternate embodiment, however, when the FFDC module 318 exists within a primary notification node (see, e.g., block 715), whose function is to broadcast notifications of specific types of life cycle events to one or more nodes within the cluster, the FFDC module 318 forwards a copy of the FFDC data to one or both of: (a) the VIOS DB 140 and (b) each other node (that may or may not be registered to receive such notifications, depending on the specific implementation) within the cluster.

Within the FFDC module 318, operations including Live System Dumps and Component Trace capturing can be initiated. All FFDC information collected by the FFDC module 318 will then be stored within the specific location (FFDC data store 190) within the distributed storage repository 150. In one or more embodiments, this location is FFDC event specific, and can be structured to enable/allow FFDC information to be grouped based on the time the recorded event occurred. In the described embodiments, all nodes within the VIOS cluster store their FFDC information within a single location (FFDC data store 190 and/or VIOS DB 140) to allow an administrator to efficiently access and analyze or package the system wide FFDC data, as needed.

Given the autonomic nature of the FFDC data capture and storage within the described embodiments, (i.e., the FFDC data capture does not require manual operations from the administrator), the described FFDC data capture provides more comprehensive set of FFDC data, which are accurately recorded at substantially the same time (or immediately after the time) that the FFDC event occurs. Further, according to one embodiment, an administrator can utilize a management tool 180 to send a cluster FFDC data dump request even if a drastic event has not been encountered within the cluster.

Turning now to FIG. 8, there is illustrated the method by which the modules of CM utility 222 detects and respond to a resource event related to I/O operations within a LU of a shared storage pool. The method begins at block 802 which illustrates the VIOS receiving an I/O request from a client LPAR (assigned to that VIOS directly or via a redundant assignment) to perform an I/O operation that accesses the assigned LU within the shared storage pool. The VIOS (through its various kernel extensions and application programming interface, API) forwards the I/O request to the distributed storage repository 150 (block 804). The VIOS receives a response to the I/O request that contains storage pool status information (block 806). The storage pool status information (or relevant portions of that data) is forwarded to the resource alert (reporting) module 314, which compares the received data with certain pre-set/pre-established thresholds and alert conditions. For example, the storage pool status information can include data bout the amount of storage space utilized or remaining within the storage pool (e.g., 80% utilized or 20% available) and the resource alert module 314 compares this data to a pre-set 75% utilization threshold value at which a resource alert condition is triggered. In response to the result of that comparison indicating that a resource alert condition is detected (as determined at block 810), the event listener 316 forwards the FFDC data to the FFDC module 318 for processing (block 812). The FFDC module 318 stores the FFDC data in the FFDC event storage location 190 within distributed storage repository 150 (block 814), and the FDC module 318 forwards the cluster-relevant FFDC data to VIOS DB 140 (block 816). The FFDC module 318 also transmits a notification message of the resource event and/or resource alert condition to the other VIOSes within the cluster that utilize the specific storage pool resource (block 818). The FFDC module 318 also transmits a notification to the management tool 180 to trigger a response to the detected resource alert condition (block 820). The process then ends at block 822.

In one embodiment, the management tool 180 can register with a primary notification VIOS for receipt of resource alert conditions. In another embodiment, the management tool 180 can periodically receive data about the occurrence of such events directly from VIOS DB 140 by reading the information from VIOS DB 140. In one embodiment, in response to receipt of a resource alert condition, the management tool 140 may dynamically perform operations to resolve the resource condition (e.g., the management tool 140 may allocate additional storage to the storage pool to bring the amount of assigned storage below 75%). In alternate embodiments, the management tool 140 may alert a system administrator of the occurrence of the detected resource event providing the system administrator with advance notice to enable the system administrator to manually correct the condition.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having: a processor, a memory coupled to the processor, at least one input/output (I/O) adapter that enables connection to an external network and a shared storage repository, a virtualization management component executing within the data processing system to generate a plurality of operating system (OS) partitions including a first virtual I/O server (VIOS) partition, a method comprising:

processing a cluster aware (CA) operating system (OS) via a processor resource of the first VIOS partition to register the first VIOS within a VIOS cluster having one or more second VIOSes and a shared VIOS database;

processing a first field/failure data capture (FFDC) module within the first VIOS to perform the functions of: receiving from an event listener a signal indicating that a first field data capture (FFDC) condition has been detected by the first VIOS; and automatically transmitting FFDC data of the FFDC condition to the shared storage repository for storage of the FFDC data within the shared storage repository.

2. The method of claim 1, wherein the first VIOS provides first VIOS related information to and receives VIOS-cluster related information from the VIOS database and wherein the FFDC module further performs the functions of transmitting to one or more second VIOSes within the VIOS cluster, one or more messages to inform the one or more second VIOSes of an occurrence of the FFDC event/condition that was detected by the first VIOS.

3. The method of claim 1, further comprising: the event listener of the first VIOS detecting an occurrence of a life cycle event within the first VIOS; and autonomously signaling the occurrence of the life cycle event to the FFDC module.

4. The method of claim 3, wherein the life cycle event is one of: (a) a failure of a VIOS within the VIOS cluster; (b) an addition of a new VIOS to the VIOS cluster; and (c) a removal of a second VIOS from the VIOS cluster.

5. The method of claim 1, further comprising:
the event listener detecting an occurrence of a resource event within a shared resource of the first VIOS and at least one other VIOS; and
the even listener autonomously signaling the occurrence of the resource event to the FFDC module.

6. The method of claim 5, wherein the resource event comprises at least one resource not being available due to a fabric loss condition.

7. The method of claim 5, wherein the resource event comprises a shared storage pool having less than a pre-set threshold amount of available space remaining and the method further comprises:
receiving a value from the shared storage indicating an amount of available space remaining for allocation within the storage pool;
comparing the value received with a threshold value; and
in response to the value being less than the threshold value, where the threshold value is a minimum remaining storage required:
dynamically generating a notification of the resource event;
forwarding the notification to a management tool within the DPS; and
forwarding relevant FFDC data to the shared storage repository.

8. The method of claim 5, wherein the resource event comprises at least one software inconsistency within an operating system software stack.

9. A computer program product comprising:
a computer readable storage medium; and
program code on said computer readable storage medium that when processed by a processor of a first virtual input/output server (VIOS) within a VIOS cluster that has a plurality of second VIOSes and a shared CIOS database (DB) enables the first VIOS to process a first field/failure data capture (FFDC) module within the first VIOS to perform the functions of: receiving from an event listener a signal indicating that a first field data capture (FFDC) condition has been detected by the first VIOS; automatically transmitting FFDC data of the FFDC condition to the shared storage repository for storage of the FFDC data within the shared storage repository; and transmitting to one or more second VIOSes within the VIOS cluster, one or more messages to inform the one or more second VIOSes of an occurrence of the FFDC event/condition that was detected by the first VIOS; wherein the first VIOS provides first VIOS related information to and receives VIOS-cluster related information from the VIOS database.

10. The computer program product of claim 9, further comprising program code that when executed provides: the event listener of the first VIOS detecting an occurrence of a life cycle event within the first VIOS; and autonomously signaling the occurrence of the life cycle event to the FFDC module, wherein the life cycle event is one of: (a) a failure of a VIOS within the VIOS cluster; (b) an addition of a new VIOS to the VIOS cluster; and (c) a removal of a second VIOS from the VIOS cluster.

11. The computer program product of claim 9, further comprising program code that when executed provides:
the event listener detecting an occurrence of a resource event within a shared resource of the first VIOS and at least one other VIOS; and
the even listener autonomously signaling the occurrence of the resource event to the FFDC module.

12. The computer program product of claim 11, wherein the resource event comprises at least one resource not being available due to a fabric loss condition.

13. The computer program product of claim 11, wherein the resource event comprises a shared storage pool having less than a pre-set threshold amount of available space remaining and the program code further comprises code that provide the functions of:
receiving a value from the shared storage indicating an amount of available space remaining for allocation within the storage pool;
comparing the value received with a threshold value; and
in response to the value being less than the threshold value, where the threshold value is a minimum remaining storage required:
dynamically generating a notification of the resource event;
forwarding the notification to a management tool within the DPS; and
forwarding relevant FFDC data to the shared storage repository.

14. The computer program product of claim 11, wherein the resource event comprises at least one software inconsistency within an operating system software stack.

15. A data processing system comprising:
one or more processors;
one or more memory coupled to the one or more processors;
a virtualization management component executing within the data processing system to generate a plurality of operating system partitions, including a first virtual input/output server (VIOS) partition, wherein the first VIOS partition comprises:
a cluster aware (CA) operating system (OS) executing on a processor resource of the first VIOS partition to register the first VIOS within a VIOS cluster having one or more second VIOSes and a shared VIOS database;
a first field/failure data capture (FFDC) module also executing within the first VIOS to perform the functions of: receiving from an event listener a signal indicating that a first field data capture (FFDC) condition has been detected by the first VIOS; automatically transmitting FFDC data of the FFDC condition to the shared storage repository for storage of the FFDC data within the shared storage repository; and transmitting to one or more second VIOSes within the VIOS cluster, one or more messages to inform the one or more second VIOSes of an occurrence of the FFDC event/condition that was detected by the first VIOS;

wherein the first VIOS provides first VIOS related information to and receives VIOS-cluster related information from the VIOS database.

16. The data processing system of claim 15, the first VIOS partition further comprising CA_OS program code that when executed provides: the event listener of the first VIOS detecting an occurrence of a life cycle event within the first VIOS; and autonomously signaling the occurrence of the life cycle event to the FFDC module, wherein the life cycle event is one of: (a) a failure of a VIOS within the VIOS cluster; (b) an addition of a new VIOS to the VIOS cluster; and (c) a removal of a second VIOS from the VIOS cluster.

17. The data processing system of claim 15, wherein the first VIOS partition further comprising CA_OS program code that when executed provides the functions of:

the event listener detecting an occurrence of a resource event within a shared resource of the first VIOS and at least one other VIOS; and the even listener autonomously signaling the occurrence of the resource event to the FFDC module.

18. The data processing system of claim 17, wherein the resource event comprises at least one resource not being available due to a fabric loss condition.

19. The data processing system of claim 17, wherein the resource event comprises a shared storage pool having less than a pre-set threshold amount of available space remaining and the first VIOS partition further comprising CA_OS program code that provide the functions of:

receiving a value from the shared storage indicating an amount of available space remaining for allocation within the storage pool;

comparing the value received with a threshold value; and in response to the value being less than the threshold value, where the threshold value is a minimum remaining storage required:

dynamically generating a notification of the resource event;

forwarding the notification to a management tool within the DPS; and forwarding relevant FFDC data to the shared storage repository.

20. The data processing system of claim 17, wherein the resource event comprises at least one software inconsistency within an operating system software stack.

* * * * *